United States Patent [19]
Lees et al.

[11] Patent Number: 5,370,753
[45] Date of Patent: Dec. 6, 1994

[54] PROCESS FOR CLADDING PRECIOUS METALS TO PRECIPITATION HARDENABLE MATERIALS

[75] Inventors: Philip W. Lees, North Attleborough, Mass.; William S. Loewenthal, Chesterland, Ohio

[73] Assignee: Brush Wellman Inc., Cleveland, Ohio

[21] Appl. No.: 114,651

[22] Filed: Aug. 31, 1993

[51] Int. Cl.$^5$ .............................................. C22F 1/08
[52] U.S. Cl. ............................... 148/536; 148/685; 228/115; 228/117; 228/228
[58] Field of Search .............. 148/536, 685; 228/115, 228/117, 228

[56] References Cited

U.S. PATENT DOCUMENTS

| | | | |
|---|---|---|---|
| 2,608,753 | 9/1952 | Mooradian | 29/199 |
| 2,871,150 | 1/1959 | Fraser | 148/530 |
| 3,302,280 | 2/1967 | LaPlante | 228/170 |
| 3,615,902 | 10/1971 | Lesmey | 148/530 |
| 3,959,030 | 5/1976 | Satake | 148/531 |
| 4,354,301 | 10/1982 | Takeuchi | 29/160.6 |
| 4,429,022 | 8/1984 | Breedis | 148/536 |
| 4,500,028 | 2/1985 | Breedis et al. | 228/117 |
| 4,565,586 | 1/1986 | Church et al. | 148/411 |
| 4,599,120 | 7/1986 | Church | 148/414 |

*Primary Examiner*—Richard O. Dean
*Assistant Examiner*—Sikyin Ip
*Attorney, Agent, or Firm*—Hopgood, Calimafde

[57] ABSTRACT

A process for cladding precious metals to precipitation hardenable materials. In accordance with one aspect of the present invention, are the steps of (i) placing a precious metal layer of a first selected thickness atop a selected beryllium-copper alloy base metal strip of a second selected thickness to approximate a desired final product thickness, (ii) cold rolling the layer and strip to reduce their respective thicknesses by generally more than 50%, (iii) heating the layer and strip to a first selected temperature generally within a range of 1000°–1300° F., (iv) maintaining the first temperature for a first selected time to promote metallic bonding of the layer to the strip while softening the base metal, (v) pickling the layer and strip to remove surface oxides, (vi) cold rolling the layer and strip to a thickness generally 11% greater than that of the desired final product thickness, (vii) heating the layer and strip to a second selected temperature generally within a range of 1250°–1400° F., (viii) maintaining the second temperature for a second selected time to effect dissolution of the beryllium into the copper and growth of metallic grains in the alloy to a desired size, with minimal diffusion of the base metal into the precious metal, (ix) pickling bonded strip and layer to remove surface oxides, (x) cold rolling the layer and strip generally to the desired final product thickness, (xi) heating the layer and strip to a third selected temperature generally within a range of 500°–800° F. and (xii) maintaining the third temperature for a third selected time to resurrect strength, ductility and conductivity of the base metal.

6 Claims, 1 Drawing Sheet

PROCESS FOR CLADDING PRECIOUS METALS TO PRECIPITATION HARDENABLE MATERIALS

FIELD OF THE INVENTION

The present invention relates to processes for joining precious metals to precipitation hardenable materials and more particularly to a process for cladding a precious metal to a precipitation hardenable base metal which minimizes use of precious metal while sustaining strength, ductility and conductivity of the base metal.

BACKGROUND OF THE INVENTION

When cladding a precious metal to a precipitation hardenable base metal, thermally induced diffusion (or interdiffusion) between the metals is common. The result is diminished purity of the precious metal. Because interdiffusion is a function of temperature, it becomes significant when cladding with base metals of relatively high annealing temperatures, e.g., beryllium-copper alloys.

To compensate for interdiffusion, substantial amounts of precious metal have been used in excess of that required for the finished product, i.e., electronic connectors. For this reason, beryllium-copper alloys have been found relatively costly for use as a base metal.

Conventional copper alloys with relatively low annealing temperatures such as phosphor bronze are processed, e.g., by cladding, with minimal interdiffusion. While relatively economical for use as a base metal, phosphor bronze lacks the strength, ductility and conductivity of beryllium-copper alloys.

SUMMARY OF THE INVENTION

In accordance with one aspect of the present invention, there is provided an improved process for cladding precious metals to beryllium-copper alloys. The process comprises the steps of (i) placing a precious metal layer of a first selected thickness atop a selected beryllium-copper alloy base metal strip of a second selected thickness to approximate a desired final product thickness, (ii) cold rolling the layer and strip to reduce their respective thicknesses by generally more than 50%, (iii) heating the layer and strip to a first selected temperature generally within a range of 1000°–1300° F., (iv) maintaining the first temperature for a first selected time to promote metallic bonding of the layer to the strip while softening the base metal, (v) pickling the layer and strip to remove surface oxides, (vi) cold rolling the layer and strip to a thickness generally 11% greater than that of the desired final product thickness, (vii) heating the layer and strip to a second selected temperature generally within a range of 1250°–1400° F., (viii) maintaining the second temperature for a second selected time to effect dissolution of the beryllium into the copper and growth of metallic grains in the alloy to a desired size, with minimal diffusion of the base metal into the precious metal, (ix) pickling the strip and layer to remove surface oxides, (x) cold rolling the layer and strip generally to the desired final product thickness, (xi) heating the layer and strip to a third selected temperature generally within a range of 500°–800° F. and (xii) maintaining the third temperature for a third selected time to resurrect strength, ductility and conductivity of the base metal.

Although the present invention is described in connection with a copper alloy which includes beryllium, it may be adapted for cladding precious metals to other precipitation hardenable materials such as alloys of nickel, titanium and iron.

Accordingly, it is an object of the present invention to clad a precious metal to a beryllium-copper alloy base metal with minimal consumption of precious metal while preserving strength, ductility and conductivity of the base metal.

Another object of the present invention is to provide for the simple, efficient and economical manufacture of precious metal clad beryllium-copper alloy strip products.

Still another object of the present invention is to clad precious metals to beryllium-copper alloys at relatively low process temperatures to reduce interdiffusion.

Still other objects and advantages of the present invention will become apparent from the following description of the preferred embodiments.

DETAILED DESCRIPTION OF THE PREFERRED EMBODIMENT

Precipitation hardenable materials of high strength, ductility and conductivity such as beryllium-copper alloys have been found desirable for use as base metals in electronic connectors, e.g., for automobiles and the like. Because conventional methods of electroplating (or cladding) phosphor bronze with precious metals are performed with relatively little interdiffusion, beryllium-copper alloys have been generally less economical for commercial use.

It has been found, however, that by using annealing temperatures notably lower and for longer times than those of conventional processes, interdiffusion between precious metals and beryllium-copper alloys is reduced exponentially. Less precious metal is then required to produce the finished product, lowering costs.

In accordance with one aspect of the present invention, there is provided an improved process for cladding precious metals to beryllium-copper alloy base metals. The process comprises the steps of (i) placing a precious metal layer of a first selected thickness atop a selected beryllium-copper alloy base metal strip of a second selected thickness to approximate a desired final product thickness, (ii) roll bonding the layer to the strip to reduce their respective initial thicknesses by generally more than 50%, (iii) heating the layer and strip to a first selected temperature generally within a range of 1000°–1300° F., (iv) maintaining the first temperature for a first selected time to promote metallic bonding of the layer to the strip while softening the base metal, (v) pickling the layer and strip to remove surface oxides, (vi) roll bonding the layer to the strip to a thickness generally 11% greater than that of the desired final product thickness, (vii) heating the layer and strip to a second selected temperature generally within a range of 1250°–1400° F., (viii) maintaining the second temperature for a second selected time to effect dissolution of the beryllium into the copper and growth of metallic grains in the alloy to a desired size, with minimal diffusion of the base metal into the precious metal, (ix) pickling the strip and layer to remove surface oxides, (x) roll bonding the layer to the strip generally to the desired final product thickness, (xi) heating the layer and strip to a third selected temperature generally within a range of 500°–800° F. and (xii) maintaining the third temperature for a third selected time to resurrect strength, ductility and conductivity of the base metal.

Figure 1:
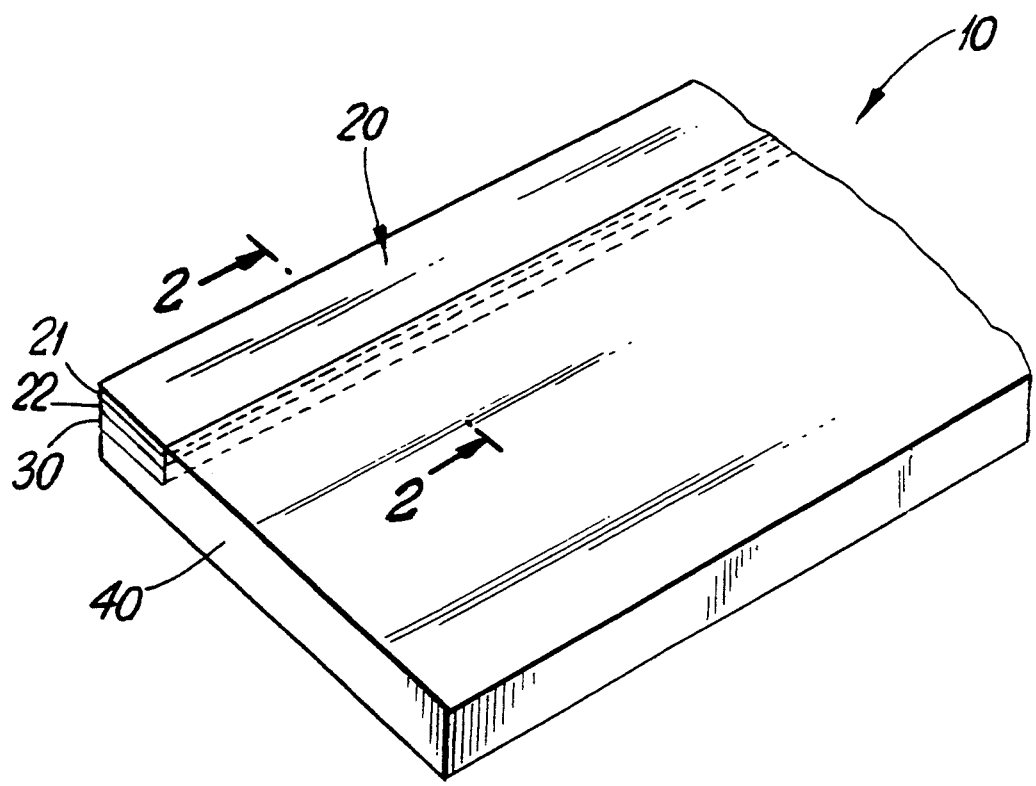
FIG. 1 is a perspective view of a section of precious metal clad beryllium-copper strip product, in accordance with one aspect of the present invention.
Figure 2:
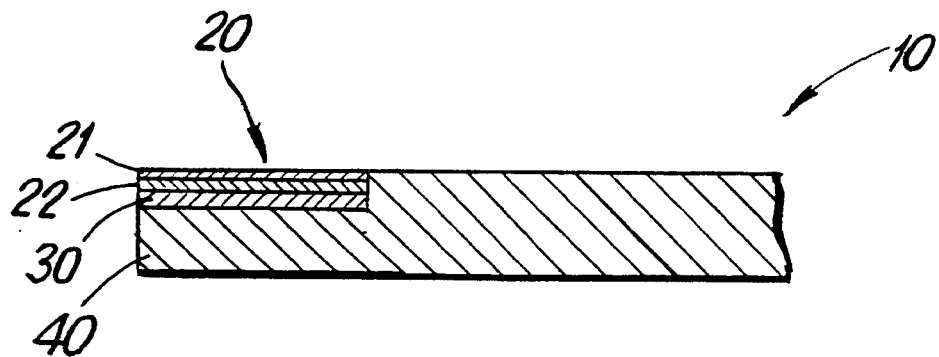
FIG. 2 is a sectional view taken along line 2—2 of FIG. 1 showing the respective layers of the strip product. The same numerals are used throughout the figure drawings to designate similar elements.

Referring now to FIGS. 1 and 2, there is shown generally a precious metal clad beryllium-copper alloy strip product 10. To achieve a product having, for example, a base metal 0.010 inch thick ¼ HM in beryllium-copper alloy with 0.00003 inch thick nominal precious metal thickness, a stripe of precious metal 20 is layered initially to a first selected thickness, e.g., about 0.000197 inch, upon one edge of a beryllium-copper alloy base metal strip 40 of a second selected thickness, e.g., approximately 0.062 inch. The thicknesses are selected depending on device, function and specifications, as will be appreciated by those skilled in the art.

Precious metal stripe 20 is preferably a layered composite which comprises a layer 21 of gold joined, e.g., by cladding, to layer 22 of palladium or palladium alloy. Examples include a palladium-silver alloy containing about 60% palladium and about 40% silver and a palladium-nickel alloy of about 80% palladium and about 20% nickel.

Next, a first bonding step is performed. During this step, the precious metal layer is roll bonded to the base metal strip, e.g., preferably by cold rolling, reducing their respective initial thicknesses by generally more than 50%. In the present example, the base metal strip is reduced in thickness from approximately 0.062 inch to 0.0285 inch. The precious metal thickness is reduced proportionately.

As best seen in FIG. 2, a diffusion barrier 30 such as a layer of nickel is placed between base metal strip 40 and precious metal stripe 20 to further reduce interdiffusion between the bonded layers. In an alternative embodiment, the diffusion barrier is omitted.

In accordance with one aspect of the present invention, cold rolling is performed using a rolling mill. The mill has rotating rolls which are separated by a selected distance from one another, the distance corresponding to the desired thickness of the strip product. Operating temperatures are generally below that which would soften the materials to be cold rolled. For instance, with beryllium-copper alloys, the maximum process temperature is around 200° F. Preferably, a lubricating oil is used during cold rolling to maintain a uniform surface finish and extract heat.

During a first heating phase, the bonded precious metal layer and beryllium-copper alloy base metal are heated to a first temperature generally within a range of 1000°–1300° F. A temperature of 1150° F. has been found suitable. This temperature is maintained for a first selected time, e.g., about 3–5 minutes, sufficient to soften the base metal and promote metallic bonding of the precious metal layer to the base metal strip.

Suitable first temperatures are as much as about 250° F. below those of conventional processes for cladding beryllium-copper alloys, for example, 1450°–1550° F. By lowering the temperature, interdiffusion between the precious metal and beryllium-copper alloy is decreased, thereby reducing precious metal requirements. Because less precious metal is needed, the present invention advantageously provides cost effective production of precious metal clad beryllium-copper alloy strip products.

As an intermediate step, the layer and strip are pickled, preferably in a bath of either sulfuric or nitric acid, to remove oxides from base metal surfaces which typically develop during high temperature annealing operations. The pickling process preferably involves one or more pre-pickling stages followed by a bright pickle stage. During the pre-pickle stage(s), the layer and strip are immersed in a first hot acid solution, e.g., 20% to 30% sulfuric acid at a temperature generally within a range of 150°–180° F. Alternatively, a solution of caustic soda is used.

The bright pickle stage then utilizes a second hot acid solution, e.g., about 15% to 20% nitric acid at a temperature ranging generally from room temperature to about 100° F. Alternatively, the acid solution comprises around 20% to 30% sulfuric acid at a temperature ranging generally from room temperature to about 150° F. After each stage, the layer and strip are immersed in rinsing and neutralizing solutions, as is known by those skilled in the art.

During the next step of the present invention, the bonded precious metal layer and beryllium-copper alloy base metal strip are again roll bonded to one another, e.g., preferably by cold rolling, but this time to a combined thickness generally 11% greater than that of the final product, e.g., about 0.011 inch.

A second heating phase is then performed. During this phase, the bonded layer and base metal are exposed to a second selected temperature generally within a range of 1250°–1400° F. Like the first heating phase, the second temperature is substantially lower than those temperatures used during conventional processing of beryllium-copper alloys, such as 1450° F. The objective, again, is to reduce precious metal requirements by decreasing the amount of interdiffusion between the precious metal and beryllium-copper alloy.

This second temperature, e.g., about 1350° F., is maintained for a second selected time sufficient to cause dissolution of beryllium into copper (within the beryllium-copper alloy) and growth of the alloy's metallic grains to a size desirable for selected mechanical properties, i.e., strength, ductility and conductivity. It will be understood, however, by those skilled in the art that the duration of heating is not so long as to cause significant diffusion of the base metal into the precious metal. A second selected time of generally 1–3 minutes has been found suitable.

The bonded precious metal layer and base metal are again pickled in acid to remove metal oxides from the metal surface which may develop during heating, and roll bonded, e.g., by cold rolling, this time to a final product thickness, such as 0.010032 inch.

Finally, the bonded layer and base metal strip are heated to a third selected temperature generally within a range of 500°–800° F. The third temperature, e.g., approximately 700° F., is maintained for a third selected time, up to about 4 hours, sufficient to develop the desired mechanical properties in the strip product, such as strength (hardness), ductility and conductivity.

A variety of tests have been conducted using the present process. Representative examples are set forth below.

EXAMPLE 1

| | |
|---|---|
| Base Metal Start Thickness | 0.060 inch |
| Beryllium Content | 1.90 weight % |
| Precious Metal Start Thickness | 0.000360 inch total |
| | (0.000040 inch Au) |
| | (0.000320 inch Pd—Ag alloy) |
| Roll Bonding | 0.060 to 0.028 inch |
| Annealing | 1300° F. for 2 min. |
| Pickling | sulfuric acid bath |
| Cold Rolling | 0.0280 to 0.0112 inch |
| Annealing | 1300° F. for 4 min. |
| Pickling | sulfuric acid bath |
| Cold Rolling | 0.0112 to 0.0100 inch |
| Annealing | 700° F. for 10 min. |
| Base Metal Final Thickness | 0.0100 inch |
| Ultimate Tensile Strength | 130 ksi |
| 0.2% Offset Yield Strength | 108 ksi |
| % Elongation in 2" | 14 |
| Electrical Conductivity | 21.2% IACS |
| % Stress Remaining after 1000 hours @ 125° C. | 90 |
| Precious Metal Final Thickness | 0.000056 inch total |
| | (0.000006 inch Au) |
| | (0.000050 inch Pd—Ag alloy |
| Initial Contact Resistance | 4.3 milliohms |
| Contact Resistance - 1000 hours | |
| Measured at 150° C. | 3.7 milliohms |
| Measured at 200° C. | 3.7 milliohms |

EXAMPLE 2

| | |
|---|---|
| Base Metal Start Thickness | 0.054 inch |
| Beryllium Content | 1.76 weight % |
| Precious Metal Start Thickness | 0.000204 inch total |
| | (0.000021 inch Au) |
| | (0.000183 inch Pd—Ag alloy) |
| Roll Bonding | 0.054 to 0.018 inch |
| Annealing | 1300° F. for 2 min. |
| Pickling | sulfuric acid bath |
| Cold Rolling | 0.0180 to 0.0112 inch |
| Annealing | 1350° F. for 3.3 min. |
| Pickling | sulfuric acid bath |
| Cold Rolling | 0.0112 to 0.0100 inch |
| Annealing | 725° F. for 4 min. |
| Base Metal Final Thickness | 0.0100 inch |
| Ultimate Tensile Strength | 118 ksi |
| 0.2% Offset Yield Strength | 97.3 ksi |
| % Elongation in 2" | 17 |
| Electrical Conductivity | 21.5% IACS |
| % Stress Remaining after 1000 hours @ 125° C. | 87 |
| Precious Metal Final Thickness | 0.000190 inch total |
| | (0.000035 inch Au) |
| | (0.000155 inch Pd—Ag alloy) |
| Initial Contact Resistance | 1.5 milliohms |
| Contact Resistance - 1000 hours | |
| Measured at 150° C. | 3.0 milliohms |
| Measured at 200° C. | 3.0 milliohms |

Again, by using annealing temperatures notably lower than those of conventional processes, the coefficient of diffusion (or interdiffusion) between the precious metal layer and the base metal is reduced exponentially. This results in a substantial reduction in the precious metal needed to produce the finished strip product, lowering costs. In this manner, the present process advantageously produces strip products of precious metal clad beryllium-copper alloy of desired physical and mechanical properties, e.g., those within standard published temper designations, but at a significantly lower cost than conventional methods.

Although the embodiments illustrated herein have been described for use with a beryllium-copper alloy, an equivalent process could be practiced on other precipitation hardenable materials such as alloys of nickel, titanium or iron, giving consideration to the purpose for which the present invention is intended. Similarly, precious metals and their alloys other than those of gold or silver may be clad to beryllium-copper alloys or other suitable precipitation hardenable materials.

Various modifications and alterations to the present invention may be appreciated based on a review of this disclosure. These changes and additions are intended to be within the spirit and scope of the invention as defined by the following claims.

What is claimed is:

1. A process for cladding precious metals to beryllium-copper alloys, which comprises the steps of:
   (a) placing a precious metal layer of a first selected thickness atop a selected beryllium-copper alloy base metal strip of a second selected thickness to approximate a desired final product thickness;
   (b) roll bonding the layer and strip to reduce their thickness by more than about 50%;
   (c) heating the layer and strip from step (b) to a first selected temperature within a range of about 1000°–1300° F.;
   (d) maintaining the first temperature for a first selected time within a range of about 3–5 minutes to promote metallic bonding of the layer to the strip while softening the base metal and forming surface oxides on the strip;
   (e) pickling the layer and strip from step (d) to remove surface oxides from the strip;
   (f) roll bonding the layer and strip from step (e) to a thickness about 11% greater than that of the desired final product thickness;
   (g) heating the layer and strip from step (f) to a second selected temperature within a range of about 1250°–1400° F. wherein beryllium dissolves into copper within the base metal strip;
   (h) maintaining the second temperature for a second selected time within a range of about 1–3 minutes to effect dissolution of the beryllium into the copper and growth of metallic grains in the alloy to a desired size, where reduction in thickness of the precious metal is within a range of about 6% to 84% and further surface oxides are formed on the strip;
   (i) pickling the layer and strip from step (h) to remove surface oxides from the strip;
   (j) roll bonding the layer and strip from step (i) to the desired final product thickness;
   (k) heating the layer and strip from step j to a third selected temperature within a range of about 500°–800° F.; and
   (l) maintaining the third temperature for a third selected time greater than 0 hours but less than or equal to about 4 hours to resurrect strength, ductility and conductivity of the base metal strip.

2. The process set forth in claim 1 wherein step (b) comprises the step of cold rolling.

3. The process set forth in claim 1 wherein step (f) comprises the step of cold rolling.

4. The process set forth in claim 1 wherein step (j) comprises the step of cold rolling.

5. The process set forth in claim 1 wherein the precious metal comprises gold.

6. The process set forth in claim 1 wherein the precious metal comprises silver.

* * * * *